(12) United States Patent
Kwon et al.

(10) Patent No.: US 10,361,470 B2
(45) Date of Patent: Jul. 23, 2019

(54) BATTERY MODULE HAVING ALL-SOLID-STATE BATTERY AND CARTRIDGE

(71) Applicant: LG CHEM, LTD., Seoul (KR)

(72) Inventors: Ki-Young Kwon, Daejeon (KR);
Da-Young Sung, Daejeon (KR);
Young-Jin Yi, Daejeon (KR);
Min-Chul Jang, Daejeon (KR);
Byoung-Hyo Jung, Daejeon (KR);
Ye-Hoon Im, Daejeon (KR);
Doo-Kyung Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 108 days.

(21) Appl. No.: 15/548,372

(22) PCT Filed: Feb. 4, 2016

(86) PCT No.: PCT/KR2016/001256
§ 371 (c)(1),
(2) Date: Aug. 2, 2017

(87) PCT Pub. No.: WO2016/182170
PCT Pub. Date: Nov. 17, 2016

(65) Prior Publication Data
US 2018/0034121 A1     Feb. 1, 2018

(30) Foreign Application Priority Data
May 14, 2015   (KR) .................. 10-2015-0067610

(51) Int. Cl.
H01M 10/50 (2006.01)
H01M 10/658 (2014.01)
(Continued)

(52) U.S. Cl.
CPC ....... H01M 10/658 (2015.04); H01M 2/0277 (2013.01); H01M 2/1077 (2013.01);
(Continued)

(58) Field of Classification Search
CPC ............. H01M 10/658; H01M 10/615; H01M 10/625; H01M 10/627; H01M 10/63;
(Continued)

(56) References Cited

U.S. PATENT DOCUMENTS

2010/0151307 A1   6/2010  Naganuma
2012/0103714 A1*  5/2012  Choi .................. B60K 1/04
                                        180/68.5
(Continued)

FOREIGN PATENT DOCUMENTS

DE    102013004391 A1   9/2014
JP    2012-119156 A     6/2012
(Continued)

OTHER PUBLICATIONS

International Search Report for PCT/KR2016/001256 (PCT/ISA/210) dated Jun. 3, 2016.

*Primary Examiner* — Raymond Alejandro
(74) *Attorney, Agent, or Firm* — Birch, Stewart, Kolasch & Birch, LLP

(57) ABSTRACT

A cartridge having a novel structure for guaranteeing stable operational performance of a secondary battery that operates at a high temperature or has improved performance at a high temperature, and a battery module including the cartridge is provided. The battery module includes at least one secondary battery; and a cartridge receiving at least a portion of the secondary battery and configured to be stacked in at least one direction, the cartridge including a heat insulating member.

17 Claims, 10 Drawing Sheets

(51) Int. Cl.
  *H01M 10/615* (2014.01)
  *H01M 10/625* (2014.01)
  *H01M 10/627* (2014.01)
  *H01M 10/63* (2014.01)
  *H01M 10/6554* (2014.01)
  *H01M 2/02* (2006.01)
  *H01M 10/48* (2006.01)
  *H01M 2/10* (2006.01)
  *H01M 10/0562* (2010.01)
  *H01M 10/0525* (2010.01)
  *H01M 10/052* (2010.01)
  *H01M 10/647* (2014.01)

(52) U.S. Cl.
  CPC ..... *H01M 2/1094* (2013.01); *H01M 10/0562* (2013.01); *H01M 10/486* (2013.01); *H01M 10/615* (2015.04); *H01M 10/625* (2015.04); *H01M 10/627* (2015.04); *H01M 10/63* (2015.04); *H01M 10/6554* (2015.04); *H01M 10/052* (2013.01); *H01M 10/0525* (2013.01); *H01M 10/647* (2015.04); *H01M 2220/10* (2013.01); *H01M 2220/20* (2013.01); *H01M 2300/0065* (2013.01); *H01M 2300/0068* (2013.01)

(58) Field of Classification Search
  CPC .. H01M 10/653; H01M 10/6554; H01M 2/02; H01M 2/0277; H01M 2/10; H01M 10/0585; H01M 10/486; H01M 10/0525; H01M 2220/10; H01M 2220/20
  See application file for complete search history.

(56) References Cited

U.S. PATENT DOCUMENTS

2014/0193685 A1     7/2014  Lim
2016/0093862 A1*    3/2016  DeKeuster ............ H01M 2/206
                                                        429/121

FOREIGN PATENT DOCUMENTS

| | | |
|---|---|---|
| JP | 2013-242979 A | 12/2013 |
| KR | 10-2008-0112653 A | 12/2008 |
| KR | 10-2003-0046999 A | 5/2013 |
| KR | 10-2014-0089456 A | 7/2014 |
| KR | 10-2014-0091622 A | 7/2014 |
| WO | WO 2013/065942 A1 | 5/2013 |

* cited by examiner

BATTERY MODULE HAVING ALL-SOLID-STATE BATTERY AND CARTRIDGE

TECHNICAL FIELD

The present application claims priority to Korean Patent Application No. 10-2015-0067610 filed on May 14, 2015 in the Republic of Korea, the disclosure of which is incorporated herein by reference.

The present disclosure relates to a battery, and more particularly, to a battery module capable of maintaining the temperature around a secondary battery at a predetermined value or higher.

BACKGROUND ART

Generally, unlike primary batteries which can not be charged, secondary batteries are rechargeable and are widely used in various fields and devices such as cellular phones, laptop computers, or camcorders. Examples of currently commercialized secondary batteries include nickel-cadmium batteries, nickel-metal hydride batteries, nickel-zinc batteries, and lithium secondary batteries, and batteries such as metal-air batteries, all-solid-state batteries, sodium-based batteries, or magnesium batteries have been of great interest and developed as next-generation batteries.

Among such various secondary batteries, lithium secondary batteries are freely rechargeable because of substantially no memory effect compared with nickel-based secondary batteries, and thus have a very low self-discharge rate and high energy density, and owing to these merits, there has been high interest in lithium secondary batteries.

In general, such a lithium secondary battery uses a lithium-based oxide as a positive electrode active material and a carbonaceous material as a negative electrode active material. In addition, such a lithium secondary battery is formed by accommodating a positive electrode plate coated with a positive electrode active material and a negative electrode plate coated with a negative electrode active material in a case together with an electrolyte, and a typical example of electrolytes is a liquid electrolyte which is also called "an electrolytic solution."

Secondary batteries including a liquid electrolyte are widely used owing to various advantages such as ease of handling and manufacturing, and high electrical conductivity and stable performance at room temperature. However, liquid-electrolyte batteries may have problems such as electrolytic solution leakage or gas generation, and thus the safety of such secondary batteries may be significantly lowered because of the possibility of explosions, catching on fire, discharge of noxious gas, etc.

Therefore, all-solid-state batteries using a solid electrolyte have been of great interest and developed to prevent problems such as electrolytic solution leakage and gas generation and guarantee safety. In particular, electric vehicles or power storage devices, such as electric charging stations for electric vehicles or power storage devices for smart grids, may require a large number of secondary batteries, and thus there is increasing interest in stable all-solid-state batteries. However, such all-solid-state batteries have low ionic conductivity at room temperature and may thus have a relatively high operating temperature compared with liquid-electrolyte batteries. Therefore, when all all-solid-state batteries are used to constitute battery modules, it is necessary to set relatively high temperature conditions compared with the case of using liquid-electrolyte batteries.

In general, however, battery modules of the related art are made using liquid-electrolyte batteries and thus have structures not suitable for all-solid-state batteries.

In particular, most battery modules use cartridges as structures for easily stacking and storing a plurality of pouch-type secondary batteries, protecting the secondary batteries from external impacts, and preventing relative movement of the secondary batteries. Such cartridges may be expressed in various other terms such as a stacking frame and may be configured to be stacked in a direction, for example, a vertical direction. Secondary batteries may be accommodated in inner spaces formed in stacked cartridges. In general, cartridges may have various structures to decrease the temperature of secondary batteries accommodated therein. For example, cartridges may include plate-type cooling fins or openings formed therebetween to introduce ambient air. The reason for this is that liquid-electrolyte secondary batteries included in battery modules have relatively low performance and serious safety problems such as explosions or catching on fire at temperatures much higher than the room temperature.

On the contrary, the performance of secondary batteries such as all-solid-state batteries may be poor at room temperature but may be improved at temperatures higher than the room temperature. Therefore, it is not suitable to use structures of battery modules of the related art such as a cartridge structure for all-solid-state batteries.

DISCLOSURE

Technical Problem

The present disclosure is designed to solve the problems of the related art, and therefore the present disclosure is directed to providing a battery module including a cartridge having a novel structure for guaranteeing stable operation performance of a secondary battery that operates or has improved performance at a relatively high temperature compared to a liquid-electrolyte secondary battery such as a non-aqueous electrolyte lithium battery, and an automobile including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

To achieve the objectives, the present disclosure provides a battery module including: at least one secondary battery; and a cartridge receiving at least a portion of the secondary battery and configured to be stacked in at least one direction, the cartridge including a heat insulating member.

Preferably, the secondary battery may be an all-solid-state battery.

Furthermore, preferably, the cartridge may include: a rest part configured to receive a lower portion of a secondary battery; and a lateral part standing on an edge of the rest part.

Furthermore, preferably, the heat insulating member may be provided on the lateral part.

Furthermore, preferably, the battery module may further include a lower cover including a heat insulating material in at least a portion thereof and configured to be coupled to a lower portion of a lowermost cartridge in a cartridge stack.

Furthermore, preferably, the heat insulating member may be further provided on the rest part.

Furthermore, preferably, the battery module may further include an upper cover including a heat insulating material in at least a portion thereof and configured to be coupled to an upper portion of an uppermost cartridge in a cartridge stack.

Furthermore, preferably, the cartridge may further include a lower cover part configured to surround at least a portion of a lateral outer surface of a lower cartridge in a cartridge stack.

Furthermore, preferably, the cartridge may accommodate a plurality of secondary batteries arranged in a horizontal direction and may include a partition wall part vertically standing between the secondary batteries arranged in the horizontal direction, and the partition wall part may include a heat insulating member.

Furthermore, preferably, at least a portion of the heat insulating member may be detachably attached to the cartridge.

Furthermore, preferably, the cartridge may include only the heat insulating member.

Furthermore, preferably, the heat insulating member may include at least one of glass wool, expanded polystyrene (EPS), extruded polystyrene (XPS), polyurethane foam, water-based flexible foam, urea foam, vacuum insulation panels, polyvinyl chloride (PVC), and a thermal reflective insulation material.

Furthermore, preferably, the cartridge may further include a heating member configured to supply heat to a secondary battery side.

Furthermore, preferably, the battery module may further include: a temperature measuring unit configured to measure surrounding temperatures; and a control unit configured to control operation of the heating member according to temperatures measured by the temperature measuring unit.

Furthermore, preferably, the battery module may include at least two types of secondary batteries having different ionic conductivities at room temperature.

Furthermore, preferably, the cartridge may further include a heat conduction member extending from an upper end portion to a lower end portion of the cartridge.

Furthermore, preferably, in a cartridge stack, different heat conduction members of upper and lower cartridges may be brought into contact with each other.

To achieve the objectives, the present disclosure provides an automobile including the battery module.

To achieve the objectives, the present disclosure provides a power storage device including the battery module.

Advantageous Effects

According to an aspect of the present disclosure, the battery module includes a secondary battery having stable operational performance at a relatively high temperature compared with a non-aqueous electrolyte lithium battery.

In particular, according to an embodiment of the present disclosure, the battery module is provided using an all-solid-state battery including a solid electrolyte, and the operational performance of the all-solid-state battery may be improved by increasing the surrounding temperature of the all-solid-state battery.

In addition, since the all-solid-state battery has a low risk of electrolyte leakage and gas generation, the battery module including the all-solid-state battery may not have problems such as catching on fire, explosions, or generation of harmful gas, and thus the safety of the battery module may be markedly improved.

In addition, according to an aspect of the present disclosure, heat insulating members are provided on cartridges, and thus the heat insulating members may be easily located around secondary batteries by only placing the secondary batteries in inner spaces of the cartridges while stacking the cartridges. Furthermore, since additional parts or structures are not required to insulate the secondary batteries, mounting and assembling processes for such additional insulating parts or structures may not be performed.

In more detail, according to an aspect of the present disclosure, heat generated from secondary batteries may not dissipate through stacked cartridges, but most of the heat may remain in inner spaces of the stacked cartridges. Therefore, the temperature around the secondary batteries may be stably maintained at a high value, and thus the operational performance of the secondary batteries such as all-solid-state batteries may be stably maintained. In addition, according to these aspects of the present disclosure, since the secondary batteries are maintained at a high temperature using heat generated from the secondary batteries, additional devices for supplying heat may not be used.

Therefore, according to the present disclosure, it is possible to prevent an increase in space or weight caused by insulating and heating elements or structures.

In addition, the battery module of the present disclosure may include various secondary batteries in addition to all-solid-state lithium secondary batteries having a solid electrolyte as long as the secondary batteries operate or have improved performance at temperatures higher than room temperature.

In addition, according to an aspect of the present disclosure, operation temperatures may be adjusted according to heat insulating materials, and thus optimal temperature conditions may be provided according to secondary batteries, thereby guaranteeing stable performance of the secondary batteries.

DESCRIPTION OF DRAWINGS

The accompanying drawings illustrate preferred embodiments of the present disclosure and together with the foregoing disclosure, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
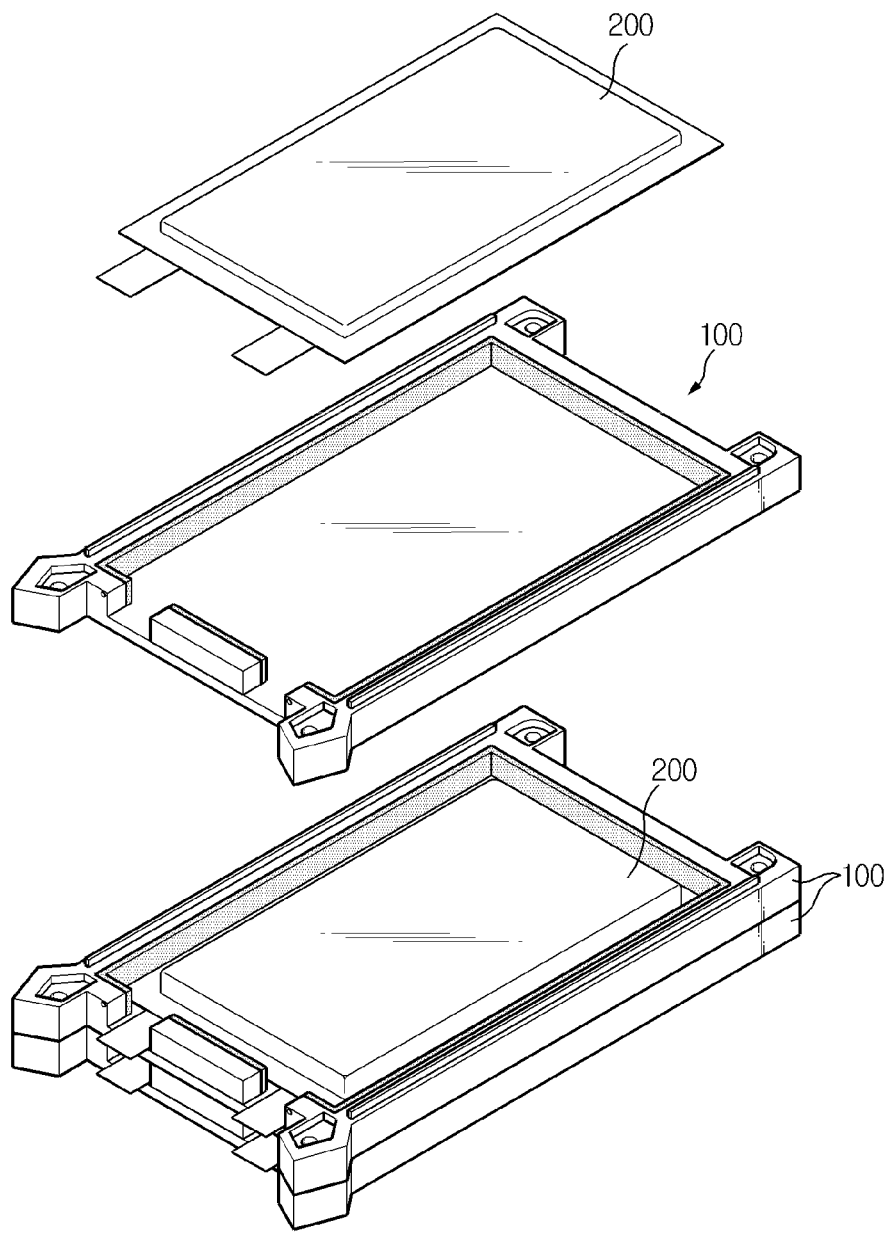
FIG. 1 is a perspective view schematically illustrating a configuration of a battery module according to an embodiment of the present disclosure.

FIG. 1 is a perspective view schematically illustrating a battery module according to an embodiment of the present disclosure.

Referring to FIG. 1, the battery module of the present disclosure may include a secondary battery 200 and a cartridge 100.

At least one secondary battery 200 may be included in the battery module. In particular, the battery module may include a plurality of secondary batteries 200. In this case, the plurality of secondary batteries 200 may be stacked in one direction, for example, in a vertical direction as shown in FIG. 1.

The secondary battery 200 may have various shapes. For example, as shown in FIG. 1, the secondary battery 200 may have a rectangular shape when viewed from the upper side. In this case, a case of the secondary battery 200 may be provided in the form of a pouch including a metal layer between polymer layers, and edge portions of the pouch may be hermetically sealed in a state in which an electrode assembly and an electrolyte are accommodated in a center portion of the pouch. Alternatively, the case of the secondary battery 200 may be provided in the form of a metallic can, and a cap assembly may be coupled to and sealed to the can in a state in which an electrode assembly and an electrolyte are accommodated in an inner space of the can.

In particular, according to the present disclosure, the secondary battery 200 may operate or have optimal performance at temperatures higher than room temperature.

Preferably, the secondary battery 200 is an all-solid-state battery. Herein, the term "all-solid-state battery" refers to a battery including a solid electrolyte in contrast to general secondary batteries including a liquid electrolyte. For example, the secondary battery 200 may be an all-solid-state lithium battery. In this case, lithium ions may move between positive and negative electrodes through a solid electrolyte. The all-solid-state battery is safer than liquid-electrolyte secondary batteries because the risk of problems such as electrolyte leakage, catching on fire, or explosions is low, and the all-solid-state battery may easily be provided in a flexible form. In addition, the all-solid-state battery may be easily configured as a high-voltage, high-density secondary battery having a small thickness.

Since the all-solid-state battery has a solid electrolyte whose ionic conductivity is not high at room temperature, the all-solid-state battery may not properly operate or have poor performance at room temperature. Therefore, for the performance of the all-solid-state battery, the all-solid-state battery may be operated at temperatures higher than room temperature. For example, the all-solid-state battery may operate or have optimal performance within a temperature range of 50° C. to 200° C. Because of these characteristics, it may be difficult to use the all-solid-state battery in a general battery module. However, the all-solid-state battery may be used in the battery module of the present disclosure. In particular, the battery module of the present disclosure includes the cartridge 100 allowing for the use of the all-solid-state batteries.

Figure 2:
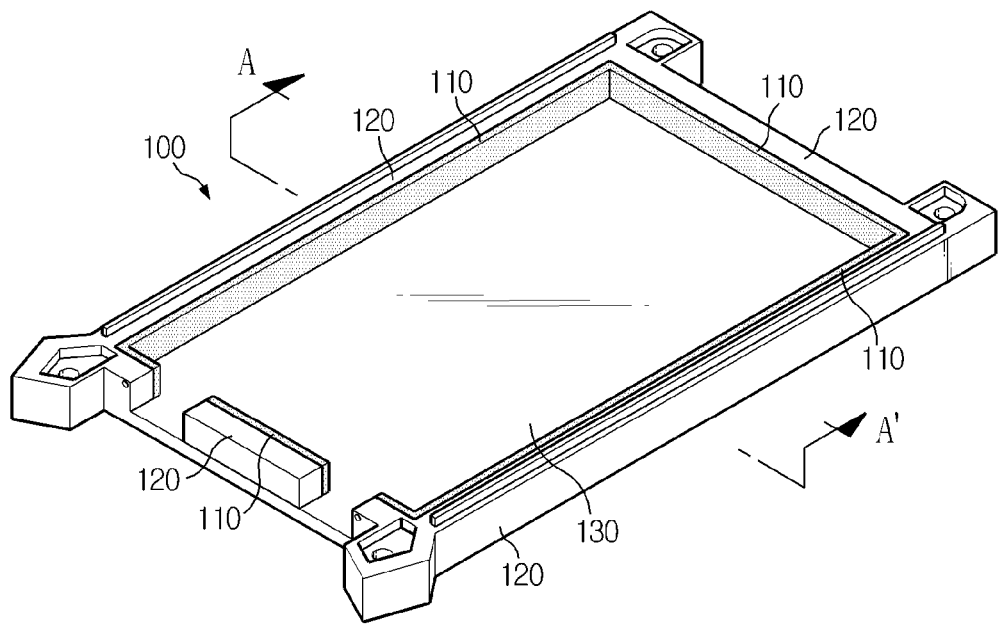
FIG. 2 is a view schematically illustrating a cartridge included in the battery module shown in FIG. 1.
Figure 3:
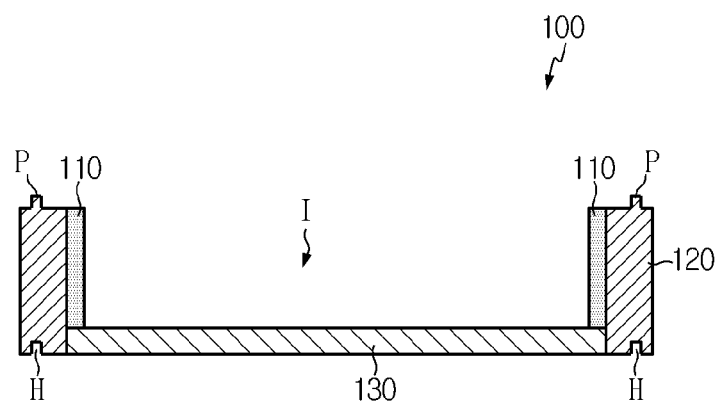
FIG. 3 is a cross-sectional view taken along line A-A' of FIG. 2.

FIG. 2 is a view schematically illustrating one of cartridges 100 of the battery module illustrated in FIG. 1, and FIG. 3 is a cross-sectional view taken along line A-A' of FIG. 2.

Referring to FIGS. 1 to 3, the cartridge 100 may accommodate and hold the secondary battery 200 while preventing relative movement of the secondary battery 200, and may guide assembling of the secondary battery 200. In particular, the cartridge 100 may have an inner space, and the secondary battery 200 may be accommodated in the inner space. For example, as indicated by I in FIG. 3, the cartridge 100 may have an inner space defined by bottom and lateral sides with an opened upper side, and the secondary battery 200 may be inserted and accommodated in the inner space through the opened upper side.

In addition, the cartridge 100 may be configured such that when the secondary battery 200 is accommodated in the cartridge 100, at least a portion of the secondary battery 200 may rest on the cartridge 100. For example, if the secondary battery 200 is a pouch-type secondary battery having a sealing portion, the sealing portion (an edge portion of the secondary battery 200) may rest on the cartridge 100, or a lower flat portion of the secondary battery 200 may entirely rest on the cartridge 100.

The cartridge 100 may be used to stack one or more secondary batteries 200, and to this end, the cartridges 100 may be configured to be stacked in at least one direction. For example, as shown in FIG. 1, the cartridge 100 may be configured to be stacked in a vertical direction. In this case, in a cartridge stack, a portion of a cartridge 100 making contact with an adjacent cartridge 100 may be flat. That is, since flat portions of cartridges 100 are brought into contact with each other, the cartridges 100 may be easily stacked in a direction perpendicular to the ground.

Particularly, the cartridge 100 of the present disclosure includes a heat insulating member 110.

The heat insulating member 110 may have a material or a structure capable of blocking or reducing heat transfer. In particular, the heat insulating member 110 may be configured to reduce or prevent heat dissipation to the outside of the cartridge 100 in which the secondary battery 200 is placed. Therefore, owing to the heat insulating members 110, the inner space of the cartridge 100 may be maintained within a certain temperature range, particularly, a temperature range higher than room temperature. For example, in the battery module of the present disclosure, the temperature of the inner space of the cartridge 100 may be maintained within the range of 50° C. to 200° C.

Owing to the configuration of the cartridge 100 of the present disclosure, the battery module may include the secondary battery 200 operating or having improved performance at temperatures higher than room temperature. In particular, as described above, the secondary battery 200 of the present disclosure may be an all-solid-state battery. The all-solid-state battery has low electrical conductivity and low performance at room temperature, and thus it is difficult to use the all-solid-state battery in a general battery module. However, according to the present disclosure, the battery module includes the cartridge 100 having the heat insulating member 110, and the all-solid-state secondary battery is accommodated in the inner space of the cartridge 100. Thus, the temperature around the all-solid-state battery may be maintained at a relatively high level compared to the temperature in a general battery module.

In particular, heat may be generated during operation of the secondary battery 200, and owing to the heat insulating member 110, the heat may not be dissipated to the outside. That is, the heat may be retained in the inner space of the cartridge 100 in which the secondary battery 200 is accommodated. Therefore, the temperature of the inner space of the cartridge 100 may be maintained at a certain level or higher. Therefore, the secondary battery 200 such as an all-solid-state battery having improved performance at temperatures higher than operational temperatures of general secondary batteries may be easily applied to the battery module of the present disclosure.

The heat insulating member 110 may have a thermal conductivity of 0.1 W/mk or less at room temperature. Preferably, the heat insulating member 110 may have a thermal conductivity of 0.05 W/mk or less.

In addition, preferably, the heat insulating member 110 may include at least one of glass wool, expanded polystyrene (EPS), extruded polystyrene (XPS), polyurethane foam, water-based flexible foam, urea foam, vacuum insulation panels, polyvinyl chloride (PVC), and thermal reflective insulation materials. In this case, the heat insulating member 110 may provide more secure insulation in an operational temperature range of the all-solid-state battery.

In the battery module of the present disclosure, the temperature of the inner space of the cartridge 100 may be controlled by adjusting factors such as the type, arrangement, and thickness of the heat insulating member 110.

Preferably, the inner space of the cartridge 100 may be confined by stacking cartridges 100. The secondary battery 200 may be accommodated in the confined inner space. This will be described in more detail with reference to FIG. 4.

Figure 4:
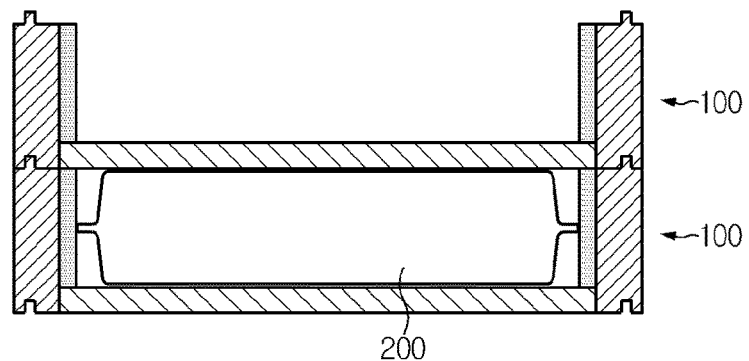
FIG. 4 is a cross-sectional view schematically illustrating a configuration in which such two cartridges as that the cartridge in FIG. 3 are stacked in a vertical direction and a secondary battery 200 is accommodated in an inner space of the cartridges.

FIG. 4 is a cross-sectional view schematically illustrating a configuration in which two cartridges 100 such as the cartridge 100 shown in FIG. 3 are stacked in a vertical direction and a secondary battery 200 is accommodated in an inner space.

Referring to FIG. 4, an opened upper side of an inner space of a lower cartridge 100 may be closed as another cartridge 100 is placed on top of the lower cartridge 100, and thus the upper side of the inner space of the lower cartridge 100 may be covered as well as the bottom and lateral sides of the lower cartridge 100 being covered. That is, referring to the configuration illustrated in FIG. 3, the inner space I of the cartridge 100 has an opened upper side, and as another cartridge 100 is placed on top of the cartridge 100 as illustrated in FIG. 4, the opened upper side of the inner space of the cartridge 100 may be covered. In addition, since the secondary battery 200 is accommodated in the inner space covered as described above, upper, lower, left, right, front, and rear sides of the secondary battery 200 may be entirely covered, and heat transfer to the outside from the inner space of the cartridge 100 may be reduced.

Preferably, as shown in the drawings, the cartridge 100 may include a rest part 130 and a lateral part 120.

The rest part 130 is a part of the cartridge 100 on which at least a portion of the secondary battery 200 is placed. Particularly, a lower portion of the secondary battery 200 may be placed on the rest part 130, and to this end, the rest part 130 may have an upper surface corresponding to the lower portion of the secondary battery 200. For example, if the lower portion of the secondary battery 200 is flat, the upper surface of the rest part 130 may also be flat. In another example, if the secondary battery 200 is a cylindrical secondary battery having a curved lower portion, the rest part 130 may have a semicircular concave recess such that the cylindrical secondary battery may be placed on the rest part 130.

The lateral part 120 may vertically stand on an edge portion of the rest part 130, that is, on an outer peripheral portion of the rest part 130. For example, as shown in FIGS. 1 and 2, if the cartridge 100 has an approximately rectangular shape when viewed from the upper side, the lateral part 120 may be formed on sides of the rectangle in a direction perpendicular to the ground. When the secondary battery 200 is accommodated in the inner space of the cartridge 100, the lateral part 120 may be located on lateral sides of the secondary battery 200 to cover the lateral sides of the secondary battery 200.

In this case, coupling portions, particularly, concave and convex portions may be formed on upper and lower ends of the lateral part 120 as a coupling structure. For example, as indicated by P in FIG. 3, convex protrusions may be formed on the upper end of the lateral part 120. In addition, as indicated by H in FIG. 3, grooves having positions and shapes corresponding to those of the protrusions may be formed in the lower end of the lateral part 120 of the cartridge 100. Therefore, as shown in FIG. 4, when the cartridges 100 are vertically stacked, protrusions of a lower lateral part 120 may be inserted into grooves of an upper lateral part 120. According to the embodiment of the present disclosure, stacking positions of the cartridges 100 may be easily recognized because the protrusions and the grooves guide vertical stacking of the cartridges 100, and the protrusions and grooves may prevent horizontal movement of the stacked cartridges 100.

In addition, the heat insulating members 110 may be provided on inner surfaces of the cartridges 100. Here, the inner surfaces refer to surfaces facing the secondary batteries 200, that is, surfaces forming the inner spaces of the cartridges 100. According to the embodiment of the present disclosure, a process for providing the heat insulating members 110 on the cartridges 100 may be easily performed. For example, the heat insulating members 110 may be attached to the inner surfaces of the cartridges 100 using an adhesive or fastening members such as bolts. Furthermore, according to the embodiment, since heat transfer to the cartridges 100 is prevented, the heat retaining ability of the inner spaces of the cartridges 100 may be improved.

Particularly, if the cartridges 100 include the rest parts 130 and the lateral parts 120 as described in the embodiment, the heat insulating members 110 may be provided on entire inner surfaces of the rest parts 130 and/or the lateral parts 120.

Preferably, the heat insulating members 110 may be provided on the lateral parts 120 of the cartridges 100. When a plurality of cartridges 100 are stacked in a vertical direction, no other cartridge 100 is located outside the lateral parts 120 of the cartridges 100, and thus the outside of the lateral parts 120 may be the outside of the battery module. Therefore, heat transfer from the inside to the outside of the cartridges 100 through the lateral parts 120 may directly lead to heat loss. However, the heat insulating members 110 provided on the lateral parts 120 may prevent such heat loss occurring through the lateral parts 120.

The heat insulating members 110 may be provided on the lateral parts 120 of the cartridges 100 but not on the rest parts 130 of the cartridges 100. When a plurality of cartridges 100 are stacked in a vertical direction, the inner space of one cartridge 100 may be located on the outside of the rest part 130 of another cartridge 100. Therefore, although heat leaks to the outside from the inner space of one cartridge 100 through the rest part 130 because the heat insulating member 110 is not provided on the rest part 130, the heat may flow into another cartridge 100 placed under the cartridge 100. That is, this heat transfer is just flow of heat inside the battery module and does not lead to heat loss.

According to the embodiment of the present disclosure, spaces necessary for forming the heat insulating members 110 may be reduced, and thus the battery module may have a simple structure and may be manufactured through simple processes with low costs.

In addition, according to the embodiment, since heat exchange occurs between the cartridges 100 stacked in a vertical direction, imbalance between temperatures around the secondary batteries 200 of the battery module may be eliminated. That is, if the temperature around some of the plurality of secondary batteries 200 of the battery module is lower than the temperature around the other secondary batteries 200 of the battery module, heat exchange may occur in a vertical direction through the rest parts 130. That is, if the temperature around a secondary battery 200 accommodated in one cartridge 100 is relatively low, heat may be transferred to the secondary battery 200 from secondary batteries 200 of the other cartridges 100 located in other layers, and thus the temperature around the secondary battery 200 may increase.

Particularly, when the battery module is used for a power storage device or an automobile, the battery module may be often placed outdoors. In this case, if the outdoor temperature is very low, for example, in winter, the temperature of the uppermost or lowermost cartridge 100 of the battery module may be relatively low. Therefore, if heat exchange easily occurs between the cartridges 100 stacked in the battery module as described in the above embodiment, the performance of the secondary batteries 200 may not be markedly decreased even when the secondary batteries 200 are located in a low-temperature environment.

Figure 5:
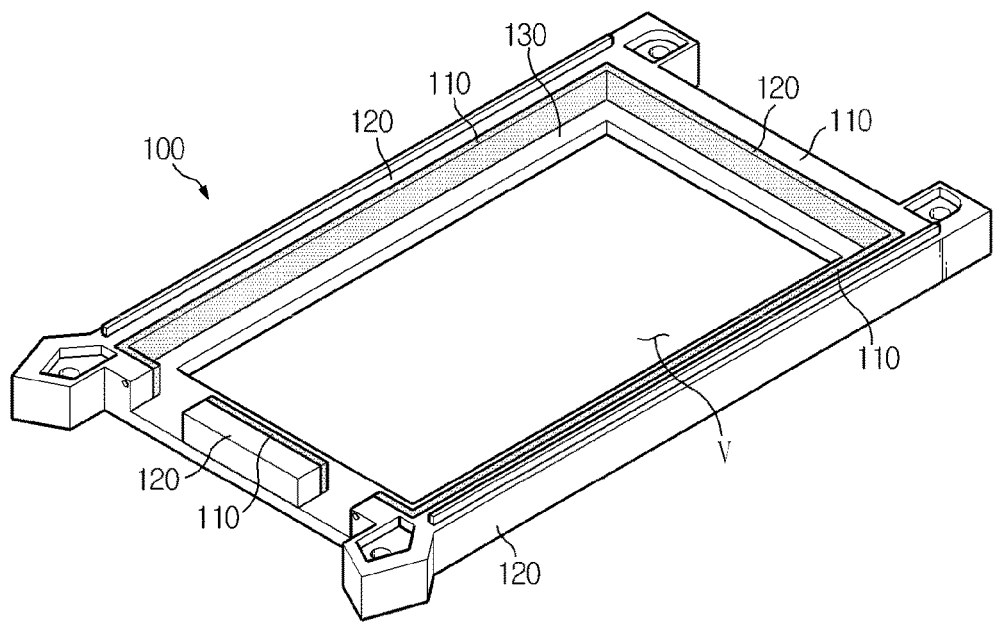
FIG. 5 is a cross-sectional view schematically illustrating a configuration of a cartridge for a secondary battery according to another embodiment of the present disclosure.

FIG. 5 is a perspective view schematically illustrating a cartridge 100 for a secondary battery according to another embodiment of the present disclosure. Hereinafter, differences from the cartridge 100 shown in FIG. 2 will be mainly described, and detailed descriptions similar to those given with reference to FIG. 2 will not be presented.

Referring to FIG. 5, like the cartridge 100 shown in FIG. 2, the cartridge 100 includes a rest part 130 and a lateral part 120. However, as indicated by V in FIG. 5, the rest part 130 has an opening in at least a portion thereof, particularly, a central portion thereof. According to this structure, edge portions of a secondary battery 200 may be placed on the rest part 130, and heat may be transferred through the center portion of the rest part 130. Therefore, heat transfer may more freely occur between vertically stacked cartridges 100, and thus balance between temperatures around vertically stacked secondary batteries 200 may be easily guaranteed.

Figure 6:
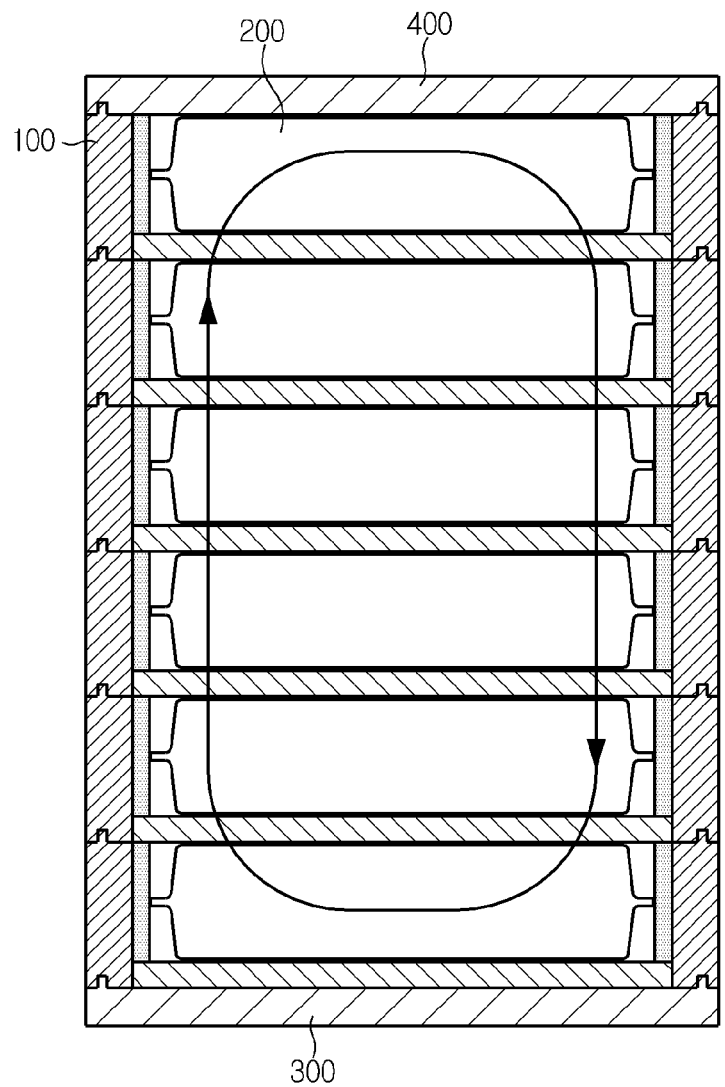
FIG. 6 is a view schematically illustrating a heat flow in a battery module in which such cartridges such as the cartridge shown in FIG. 3 are stacked.

FIG. 6 is a view schematically illustrating a heat flow in a battery module in which a plurality of cartridges 100 such as the cartridge 100 shown in FIG. 3 are stacked.

Referring to FIG. 6, the plurality of cartridges 100 are stacked in a vertical direction, and secondary batteries 200 are accommodated in inner spaces of the stacked cartridges 100. Heat insulating members 110 are provided on lateral parts 120 of the cartridges 100, and thus the lateral parts 120 may transfer substantially no heat until reaching a certain temperature. That is, heat transfer may be substantially prevented. Therefore, heat leakage through the lateral parts 120 may be prevented. However, since heat insulating members 110 are not provided on rest parts 130 of the cartridges 100, heat may flow between the cartridges 100 that are vertically stacked. Thus, in this structure, heat may flow as indicated by arrows.

This type of heat flow may occur when a plurality of cartridges 100 such as the cartridge 100 shown in FIG. 5 are stacked.

However, if heat leaks through the rest part 130 of the lowermost cartridge 100 of the stacked cartridges 100, the heat may dissipate to the outside of the battery module. Therefore, the battery module of the present disclosure may further include a lower cover 300 as shown in FIG. 6.

The lower cover 300 is coupled to a lower portion of the lowermost cartridge 100 of the vertically stacked cartridges 100. For example, protrusions provided on an upper portion of the lower cover 300 may be coupled to lower grooves H formed in a lower portion of the lowermost cartridge 100. In particular, at least a portion of the lower cover 300 may be formed of a heat insulating material. For example, the lower cover 300 may be entirely formed of a heat insulating material such as glass wool, EPS, or XPS. Alternatively, a heat insulating member 110 formed of a heat insulating material such as glass wool, EPS, or XPS may be provided on at least an upper surface of the lower cover 300.

Owing to the lower cover 300 that is at least partially formed of a heat insulating material as described above, heat may not leak from the lowermost cartridge 100 through the rest part 130 of the lowermost cartridge 100 but may be retained in the lowermost cartridge 100.

In addition, preferably, the battery module of the present disclosure may further include an upper cover 400 as shown in FIG. 6.

The upper cover 400 is coupled to an upper portion of the uppermost cartridge 100 among the plurality of cartridges 100 stacked in the vertical direction. For example, the upper cover 400 may have grooves formed in a lower portion thereof, and protrusions P of the uppermost cartridge 100 may be coupled to the grooves. At least a portion of the upper cover 400 may be formed of a heat insulating material. For example, the entirety or a lower surface of the upper cover 400 may be formed of a heat insulating material such as glass wool, EPS, or XPS.

The inner spaces of the cartridges 100 may have opened upper sides to receive the secondary batteries 200 through the opened upper sides. However, if the opened upper side of the inner space of the uppermost cartridge 100 is exposed, heat may easily leak from the secondary battery 200 accommodated in the uppermost cartridge 100 through the opened upper side. Moreover, in the structure shown in FIG. 6, heat transfer easily occurs between the stacked cartridges 100, and thus because of heat leakage through the opened upper side of the uppermost cartridge 100, temperatures around the secondary batteries 200 accommodated in the other cartridges 100 may decrease. However, as in the embodiment, when the upper cover 400 that is at least partially formed of a heat insulating material is coupled to the upper portion of the uppermost cartridge 100, heat leakage through an upper portion of the battery module is prevented, and thus the inner temperature of the uppermost cartridge 100 as well as the inner temperatures of the other cartridges 100 may not decrease to a certain value or less.

In addition, preferably, the heat insulating members 110 may be provided on upper portions of the lateral parts 120, particularly, concave and convex portions of the lateral parts 120. Since the upper portion of the lateral part 120 of one cartridge 100 is brought into contact with and coupled to another cartridge 100, heat leakage may relatively easily occur through the upper portions of the lateral parts 120. However, according to the embodiment, secure sealing and insulation may be provided owing to the heat insulating members 110. Therefore, the heat retaining ability of the inner spaces of the cartridges 100 may be further improved.

In addition, preferably, at least two concave and convex portions may be formed on each of the lateral parts 120. According to this configuration of the present disclosure, a heat outflow path may be long and complex owing to coupling between the plurality of concave and convex portions, and thus heat leakage may be more effectively prevented.

In the above-described embodiment, the case in which the heat insulating members 110 are provided only on the lateral parts 120 is mainly described. However, heat insulating members 110 may also be provided on the rest parts 130.

Figure 7:
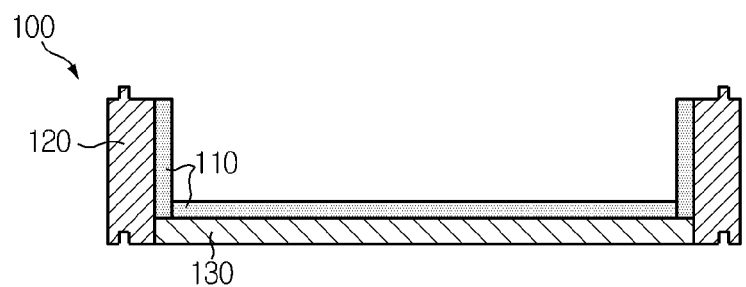
FIG. 7 is a cross-sectional view schematically illustrating a configuration of a cartridge for a secondary battery according to another embodiment of the present disclosure.
Figure 8:
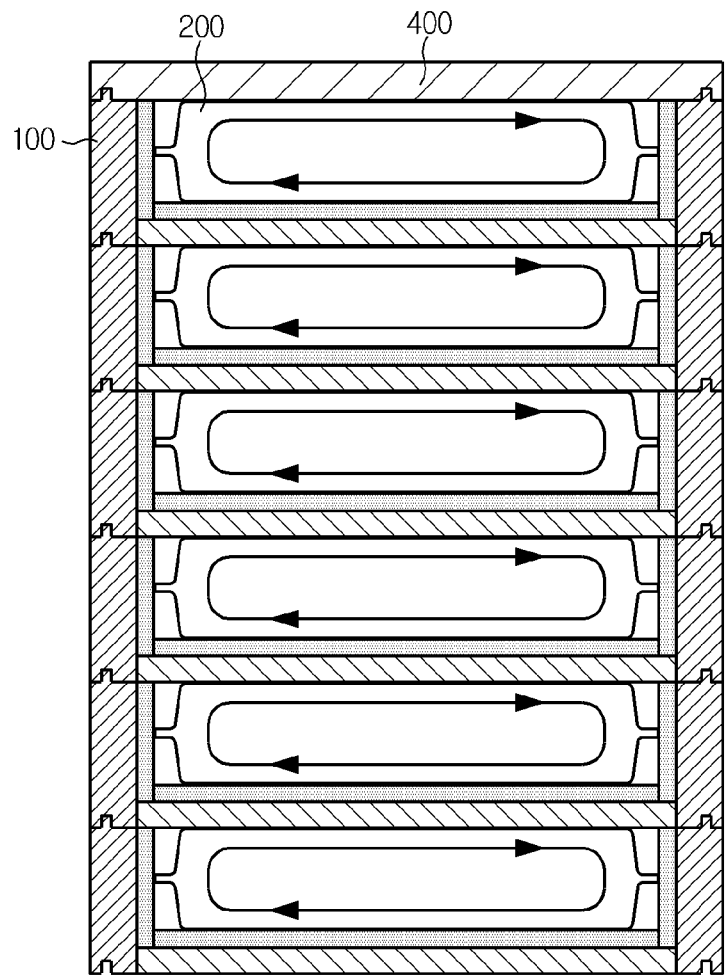
FIG. 8 is a view schematically illustrating a heat flow in a battery module in which such cartridges as the cartridge shown in FIG. 7 are stacked.

FIG. 7 is a cross-sectional view schematically illustrating a cartridge 100 for a secondary battery according to another embodiment of the present disclosure. FIG. 8 is a view schematically illustrating heat flows in a battery module in which a plurality of cartridges 100 such as the cartridge 100 shown in FIG. 7 are stacked.

First, referring to FIG. 7, heat insulating members 110 may be provided on a lateral part 120 and a rest part 130 as well. In the cartridge 100, horizontal heat transfer through the lateral part 120 may be prevented, and vertical heat transfer through the rest part 130 may also be prevented.

Therefore, as shown in FIG. 8, when a plurality of cartridges 100 are stacked in a vertical direction, heat transfer between the stacked cartridges 100 is prevented, and thus inner spaces of the cartridges 100 may be thermally isolated from each other. Therefore, as indicated by arrows, heat flows may independently occur in the cartridges 100.

According to this configuration of the present disclosure, even if the temperature of some of the cartridges 100 is suddenly lowered and the performance of secondary batteries 200 accommodated in the cartridges 100 is lowered, temperatures around secondary batteries 200 accommodated in the other cartridges 100 may not be lowered. Therefore, heat leakage caused by damage or breakage of some cartridges 100 may not affect the other cartridges 100. Particularly, the present embodiment may be suitable for the case in which the possibility of battery module damage or breakage is high.

In this configuration, as in the embodiment shown in FIG. 6, an upper cover 400 that is at least partially formed of a heat insulating material may be coupled to an opened upper side of the uppermost cartridge 100 so as to thermally block the opened upper side.

In the embodiment in which the heat insulating members 110 are provided on the lateral part 120 and the rest part 130, the thickness of the heat insulating member 110 provided on the lateral part 120 may be greater than the thickness of the heat insulating member 110 provided on the rest part 130, or the heat insulating member 110 provided on the lateral part 120 may include a material having higher heat insulating performance, that is, lower thermal conductivity than that of a material included in the heat insulating member 110 provided on the rest part 130. The reason for this is that heat flow through the lateral part 120, rather than through the rest part 130, may directly result in heat loss of a battery module.

Figure 9:
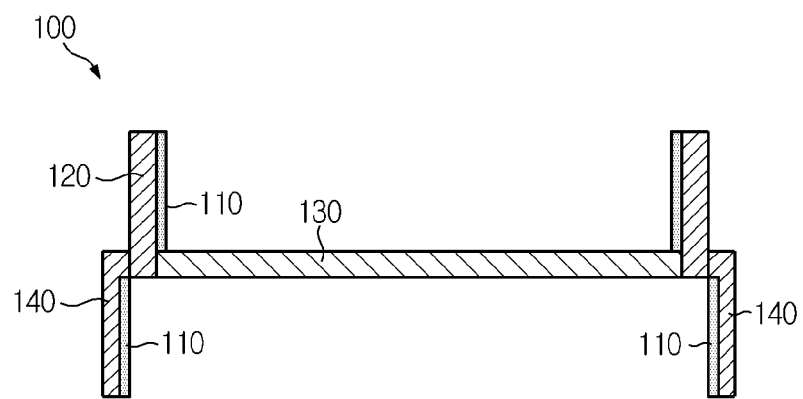
FIG. 9 is a cross-sectional view schematically illustrating a configuration of a cartridge for a secondary battery according to another embodiment of the present disclosure.
Figure 10:
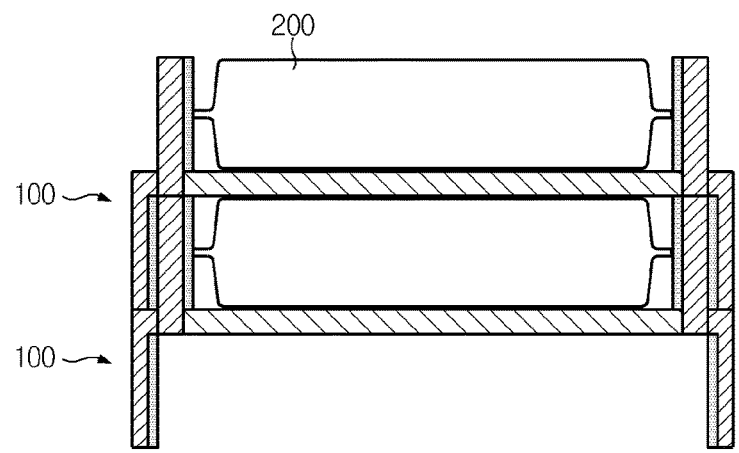
FIG. 10 is a cross-sectional view schematically illustrating a configuration in which such cartridges as the cartridge shown in FIG. 9 are stacked in a vertical direction.

FIG. 9 is a cross-sectional view schematically illustrating a configuration of a cartridge 100 for a secondary battery according to another embodiment of the present disclosure. FIG. 10 is a cross-sectional view schematically illustrating a configuration in which such cartridges 100 as the cartridge 100 shown in FIG. 9 are stacked in a vertical direction.

Referring to FIGS. 9 and 10, the cartridge 100 of a battery module of the present disclosure may further include a lower cover part 140. When the cartridge 100 is placed on top of another cartridge 100, the lower cover part 140 of the cartridge 100 may surround at least a portion of a lateral outer surface of the other cartridge 100 placed under the cartridge 100. To this end, a length of an inner space formed by the lower cover part 140 may be greater than a length of an inner space formed by the lateral part 120.

According to the embodiment of the present disclosure, when cartridges 100 are stacked in a vertical direction, a lower cover part 140 of an upper cartridge 100 may cover a lateral part 120 of a lower cartridge 100. Therefore, the inner space of the lower cartridge 100 is covered by the lateral part 120 and then the lower cover part 140, and thus horizontal heat leakage from inner space of the cartridges 100 may be more securely prevented.

In particular, as shown in FIGS. 9 and 10, heat insulating members 110 may be provided on at least portions of the lower cover parts 140 of the cartridges 100. In this case, the inner space of the lower cartridge 100 is covered by the heat insulating member 110 provided on the lateral part 120 of the lower cartridge 100 and the heat insulating member 110 provided on the lower cover part 140 of the upper cartridge 100, that is, covered by multiple layers of the heat insulating members 110. Therefore, according to the present embodiment of the present disclosure, heat loss may be effectively prevented in lateral directions.

Figure 11:
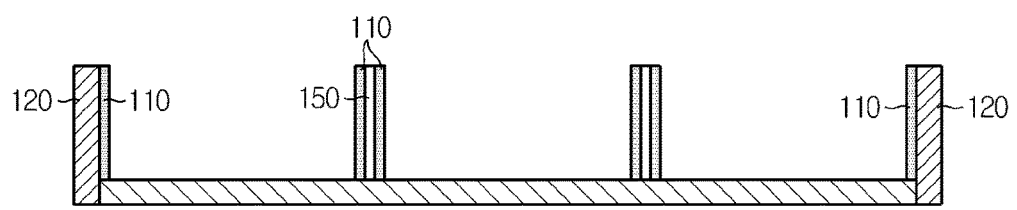
FIG. 11 is a cross-sectional view schematically illustrating a configuration of a cartridge for a secondary battery according to another embodiment of the present disclosure.

FIG. 11 is a cross-sectional view schematically illustrating a configuration of a cartridge 100 for a secondary battery according to another embodiment of the present disclosure.

Referring to FIG. 11, the cartridge 100 may accommodate a plurality of secondary batteries 200, and the secondary batteries 200 may be spaced apart from each other in a horizontal direction. In addition, the cartridge 100 may include a partition wall part 150 located between two secondary batteries 200.

In a single cartridge 100, the partition wall part 150 may vertically stand like a lateral part 120 but may be located in a center region unlike the lateral part 120. In addition, the partition wall part 150 may be located in a gap between the secondary batteries 200 that are spaced apart from each other. That is, in the cartridge 100 including the partition wall part 150, a plurality of secondary batteries 200 may be horizontally arranged in inner spaces defined by the partition wall part 150 and/or the lateral part 120.

In particular, the partition wall part 150 may include a heat insulating member 110. In the present embodiment in which the partition wall part 150 includes the heat insulating member 110, heat exchange may be decreased or prevented between the plurality of inner spaces defined by the partition wall part 150 and/or the lateral part 120. Therefore, heat may not leak between the inner spaces.

In the above-described drawings, the heat insulating member 110 is provided inside the cartridge 100. For example, in the configurations shown in FIGS. 3 and 7, the heat insulating member 110 is attached to an inner surface of the lateral part 120 and/or the rest part 130 facing the secondary battery 200. According to these embodiments, heat emitted from the secondary battery 200 or retained in the cartridge 100 may reach the heat insulating member 110 but substantially may not reach other regions of the cartridge 100, that is, a base material of the cartridge 100. Therefore, in this case, heat flow through the base material of the cartridge 100 may be blocked, and thus the inner space of the cartridge 100 may be more effectively insulated. However, the present disclosure is not limited to these embodiments.

Figure 12:
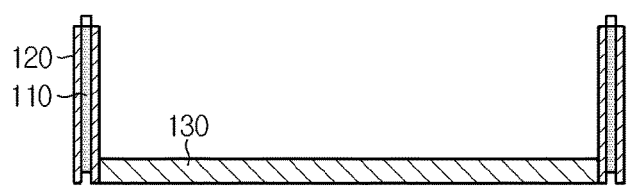
FIG. 12 is a cross-sectional view schematically illustrating a configuration of a cartridge for a secondary battery according to another embodiment of the present disclosure.

FIG. 12 is a cross-sectional view schematically illustrating a configuration of a cartridge 100 for a secondary battery according to another embodiment of the present disclosure.

Referring to FIG. 12, a heat insulating member 110 may be provided in the cartridge 100. For example, as shown in FIG. 12, when the cartridge 100 includes a rest part 130 and a lateral part 120, and the lateral part 120 may include the heat insulating member 110. In this case, the heat insulating member 110 may be embedded in the lateral part 120 such that the heat insulating member 110 may not be exposed to the outside of the lateral part 120, that is, the heat insulating member 110 may not be exposed at inner surfaces or outer surfaces of the lateral part 120. According to the present embodiment of the present disclosure, since the heat insulating member 110 is not exposed to the outside of the cartridge 100, the risk of breakage or damage of the heat insulating member 110 may be reduced.

In the above-described embodiments, only one secondary battery 200 or one layer of secondary batteries 200 is accommodated in one cartridge 100. However, the present disclosure is not limited to these embodiments.

Figure 13:
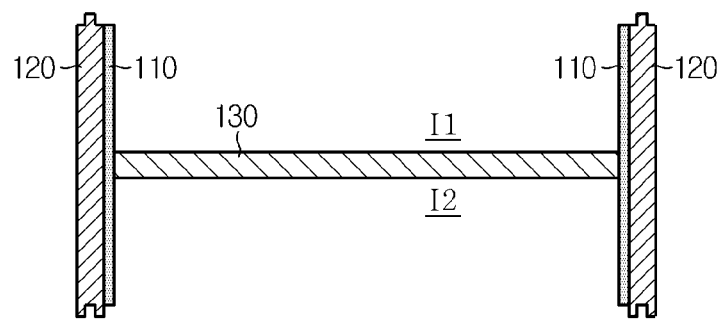
FIG. 13 is a cross-sectional view schematically illustrating a configuration of a cartridge for a secondary battery according to another embodiment of the present disclosure.

FIG. 13 is a cross-sectional view schematically illustrating a configuration of a cartridge 100 for a secondary battery according to another embodiment of the present disclosure.

Referring to FIG. 13, as in the previous embodiments, the cartridge 100 includes a lateral part 120 and a rest part 130. The lateral part 120 includes a heat insulating member 110. However, unlike the previous embodiments, the rest part 130 is located on a center portion of the lateral part 120, not on a lower end of the lateral part 120. Therefore, as indicated by I1 and I2 in FIG. 13, two inner spaces are formed in single cartridge 100, and two different secondary batteries 200 may respectively be accommodated in the two inner spaces.

According to the present embodiment of the present disclosure, secondary batteries 200 may be accommodated in two layers in one cartridge 100. Therefore, more secondary batteries 200 may be stacked using fewer cartridges 100 through fewer stacking processes.

In addition, at least a portion of the heat insulating member 110 may be detachably attached to the cartridge 100. This will be described in more detail with reference to FIG. 14.

Figure 14:
FIG. 14 is a cross-sectional view schematically illustrating a configuration of a cartridge for a secondary battery according to another embodiment of the present disclosure.

FIG. 14 is a cross-sectional view schematically illustrating a configuration of a cartridge 100 for a secondary battery according to another embodiment of the present disclosure.

Referring to FIG. 14, heat insulating members 110 may be provided on inner and outer surfaces of a lateral part 120, and at least some of the heat insulating members 110 may be detachably provided. For example, a heat insulating member 110 may be fixedly attached to the outer surface of the lateral part 120 as indicated by arrows in FIG. 14. The heat insulating member 110 attached to the outer surface of the lateral part 120 may be detachable.

According to the present embodiment of the present disclosure, if the outer heat insulating member 110 is damaged or broken, only the outer heat insulating member 110 may be replaced instead of entirely replacing the cartridge 100, and thus the cartridge 100 may be economically and easily repaired without a decrease in the insulation ability of the cartridge 100.

In addition, according to the present embodiment, the internal temperature of the cartridge 100 may be controlled by detaching or changing the outer heat insulating member 110. For example, the cartridge 100 may be used without the outer heat insulating member 110, and if it is determined that the internal temperature of the cartridge 100 is low, the outer heat insulating member 110 may be attached to the cartridge 100 to increase the internal temperature of the cartridge 100. Alternatively, if it is determined that the internal temperature of the cartridge 100 is low, the internal temperature of the cartridge 100 may be increased by replacing the outer heat insulating member 110 with another heat insulating member 110 having a higher insulating property.

In the above embodiments, the heat insulating members 110 are provided on surfaces of the cartridge 100 or inside the cartridge 100. However, the present disclosure is not limited thereto.

In particular, the cartridge 100 may be formed of only a heat insulating member 110. For example, all the lateral part 120 and the rest part 130 of the cartridge 100 may be formed of EPS only. According to the present embodiment of the present disclosure, since the cartridge 100 is entirely adiabatic, the cartridge 100 may provide improved insulation, and may be easily manufactured.

When the cartridge 100 includes the lateral part 120 and the rest part 130, either the lateral part 120 or the rest part 130, for example, the rest part 130, may be formed of only a heat insulating member 110, and the other, for example, the lateral part 120, may be formed by attaching a heat insulating member 110 to a base material or embedding a heat insulating member 110 in a base material. In the above-described embodiments, a base material of the lateral parts 120 of the cartridges 100 may have relatively high strength because the lateral parts 120 support relatively heavy loads when the plurality of cartridges 100 are stacked, and the rest parts 130 of the cartridges 100 may be formed of a heat insulating material having a high insulating property rather than high strength because the rest parts 130 support only secondary batteries 200 corresponding thereto.

Figure 15:
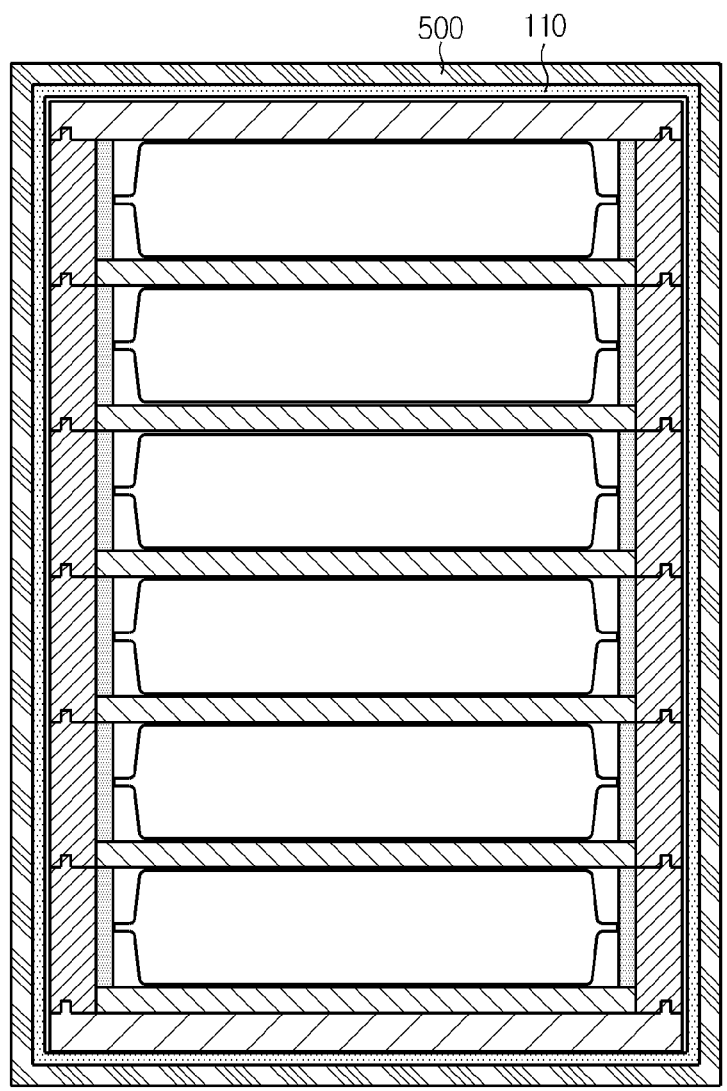
FIG. 15 is a cross-sectional view schematically illustrating a configuration of a battery module according to an embodiment of the present disclosure.

FIG. 15 is a cross-sectional view schematically illustrating a configuration of a battery module according to an embodiment of the present disclosure.

Referring to FIG. 15, the battery module of the embodiment of the present disclosure may further include a case 500 in addition to secondary batteries 200 and cartridges 100.

The case 500 has an empty inner space, and the plurality of secondary batteries 200 and the plurality of cartridges 100 are accommodated in the inner space.

In particular, according to the embodiment of the present disclosure, at least a portion of the case 500 of the battery module of the embodiment of the present disclosure may include a heat insulating material. For example, as shown in FIG. 15, a heat insulating member 110 may be attached to an inner surface of the case 500. Alternatively, the heat insulating member 110 may be attached to an outer surface of the case 500 or may be embedded in the case 500. Alternatively, the case 500 may be entirely formed of a heat insulating material.

According to the present embodiment of the present disclosure, inner spaces of the cartridges 100 may be more effectively insulated and may thus be maintained at a relatively high temperature.

Furthermore, in the battery module of the embodiment of the present disclosure, the cartridges 100 may further include a heating member.

Figure 16:
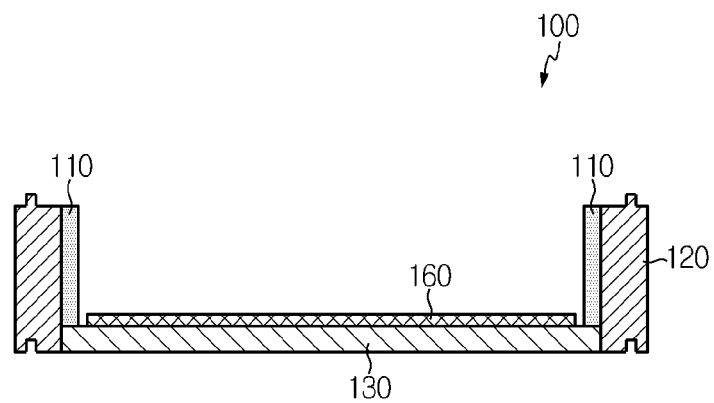
FIG. 16 is a cross-sectional view schematically illustrating a configuration of a cartridge according to another embodiment of the present disclosure.

FIG. 16 is a cross-sectional view schematically illustrating a configuration of a cartridge 100 according to another embodiment of the present disclosure.

Referring to FIG. 16, the cartridge 100 may further include a heating member 160 in addition to a heat insulating member 110.

The heating member 160 may supply heat to a secondary battery accommodated in an inner space of the cartridge 100. According to this configuration of the present disclosure, the temperature around the secondary battery may be maintained at a predetermined value or higher using heat generated from the heating member 160 in addition to using heat generated from the secondary battery.

According to this aspect of the present disclosure, the temperature of the inner space of the cartridge 100, that is, the temperature around the secondary battery, may be increased more rapidly to a higher temperature. Before the secondary battery is operated or when the secondary battery is initially operated, no heat or a small amount of heat is generated from the secondary battery, and thus there is a limit to increasing the temperature of the inner space of the cartridge 100 to a certain value or higher. However, according to the configuration of the embodiment of the present disclosure, when heat is not substantially generated from the secondary battery, heat generated from the heating member 160 may be used. Thus, the performance of the secondary battery may be stably guaranteed even when the secondary battery is initially operated or the ambient temperature is low. In addition, temperature variations depending on stacking positions of secondary batteries may be compensated for, and thus the performance of the secondary batteries may be guaranteed.

In particular, the heating member 160 may generate heat using received power. To this end, the heating member 160 may include a power terminal for receiving power. In this case, power may be supplied to the heating member 160 from the secondary battery accommodated in the inner space of the cartridge 100 or a separate battery provided outside the cartridge 100. Heat may be generated using power in various manners. For example, the heating member 160 may generate joule heat by a resistance heating method using electrical current or may generate heat by a thermal infrared radiation method.

The heating member 160 may be provided on at least one of a rest part 130 and a lateral part 120. In particular, as shown in FIG. 16, the heating member 160 may be provided on the rest part 130 of the cartridge 100.

According to the present embodiment of the present disclosure, heat generated by the heating member 160 may be efficiently transferred to the secondary battery accommodated in the cartridge 100. In the cartridge 100, the rest part 130 may have a larger surface area than the lateral part 120. A pouch-type secondary battery may have two large surfaces, and the cartridge 100 may be configured such that one of the two large surfaces of the pouch-type secondary battery may be placed on the rest part 130 of the cartridge 100. Therefore, owing to the configuration in which the heating member 160 is provided on the rest part 130, heat generated by the heating member 160 may be transferred to a large surface of the secondary battery accommodated in the cartridge 100. That is, a large amount of heat may be transferred to the secondary battery. Therefore, the temperature around the secondary battery may be increased at a high rate.

In particular, the heating member 160 may have a plate shape and may be provided on the rest part 130. In this case, the heating member 160 may cover at least a portion of a lower large surface of the secondary battery that is laid on the rest part 130 in a direction parallel to the ground. More preferably, the heating member 160 may entirely cover the lower large surface of the secondary battery placed on the rest part 130.

Preferably, as shown in FIG. 16, the heating member 160 may be provided on an upper surface of the rest part 130.

According to the present embodiment of the present disclosure, since the secondary battery is directly in contact with an upper portion of the heating member 160, heat generated from the heating member 160 may be efficiently transferred to the secondary battery. However, the present disclosure is not limited to the present embodiment. That is, the heating member 160 may be provided on the rest part 130 in various manners.

Figure 17:
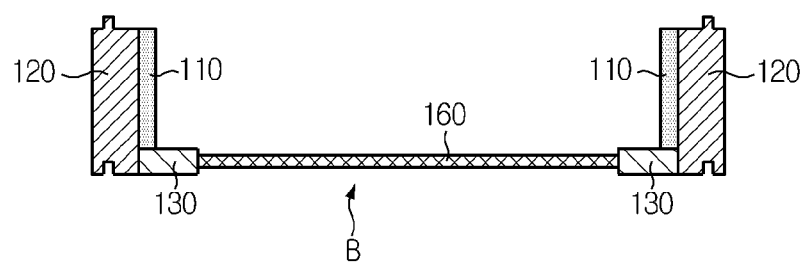
FIG. 17 is a cross-sectional view schematically illustrating a configuration of a cartridge for a secondary battery according to another embodiment of the present disclosure.

FIG. 17 is a cross-sectional view schematically illustrating a configuration of a cartridge for a secondary battery according to another embodiment of the present disclosure.

As indicated by B in FIG. 17, at least a portion of a lower portion of a heating member 160 may be exposed to the outside, that is, to the outside of the lower portion. More specifically, the cartridge includes a lateral part 120 and a rest part 130, and the rest part 130 may have an opening in a center region thereof when viewed from the upper side. That is, the rest part 130 may be formed only along edge portions of the cartridge. The heating member 160 may be placed in the opening of the rest part 130 and may thus be exposed on an upper side thereof as well as a lower side thereof.

According to this configuration of the present disclosure, when two or more cartridges are stacked in a vertical direction, a heating member 160 of a cartridge may be exposed to an inner space of the cartridge and an inner space of a lower cartridge. Therefore, in this case, heat generated from a heating member 160 of a cartridge may be effectively transferred, for example, by radiation, to a secondary battery accommodated in the cartridge and a secondary battery accommodated in a lower cartridge. Therefore, when a plurality of cartridges are stacked, a lower portion of a secondary battery accommodated in a cartridge may directly receive heat from a heating member 160 of the cartridge, and an upper portion of the secondary battery may directly receive heat from a heating member 160 of an upper cartridge. Therefore, the efficiency of heat transfer to the secondary battery may be markedly improved.

The heating member 160 and a heat insulating member 110 may be provided on at least one of the rest part 130 and the lateral part 120.

Figure 18:
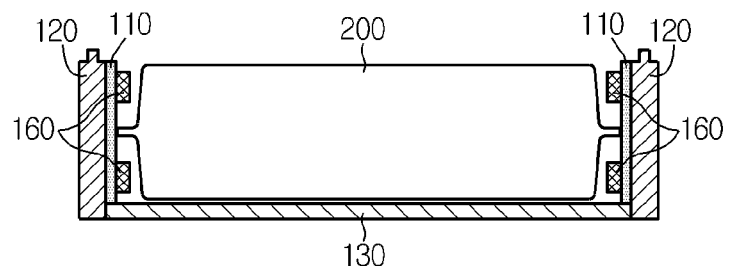
FIG. 18 is a cross-sectional view schematically illustrating a configuration of a cartridge according to another embodiment of the present disclosure.

FIG. 18 is a cross-sectional view schematically illustrating a configuration of a cartridge according to another embodiment of the present disclosure.

Referring to FIG. 18, a heat insulating member 110 and a heating member 160 may be provided on a lateral part 120. In this case, the heating member 160 may be located inside the heat insulating member 110 (referring to FIG. 18, the heating member 160 may be located on the right side of a left region and the left side of a right region). In this case, heat supplied by the heating member 160 may be blocked by the heat insulating member 110 in outward directions and may thus be transferred to only an inner space of the cartridge, thereby improving heating and insulating efficiency.

In this case, the heating member 160 may be provided on at least one of upper and lower portions of the lateral part 120 as shown in FIG. 18. Particularly, since a sealing portion of a secondary battery 200 is located in a center region of the lateral part 120, the configuration of the present embodiment in which the heating member 160 is provided on the upper portion and/or the lower portion of the lateral part 120 may increase space utilization efficiency and decrease the volume of the cartridge.

In FIG. 18, the heating member 160 is provided on some portions of an inner surface of the heat insulating member 110. However, the heating member 160 may be provided on the entire inner surface of the heat insulating member 110.

The heating member 160 may be included in the rest part 130 together with the heat insulating member 110.

In this case, the heating member 160 may be implemented in the form of heating wires. For example, the heating-wire-type heating member 160 may be attached to an upper portion of the inner surface of the heat insulating member 110. Alternatively, the heating-wire-type heating member 160 may be embedded in the heat insulating member 110.

According to the embodiment in which the heating member 160 is implemented in the form of heating wires, a weight increase caused by the heating member 160 may be reduced, and thus the weight of the cartridge may be reduced. In addition, the heating member 160 may occupy a relatively small space, thereby decreasing the volume of the cartridge or increasing a secondary battery accommodating space.

Figure 19:
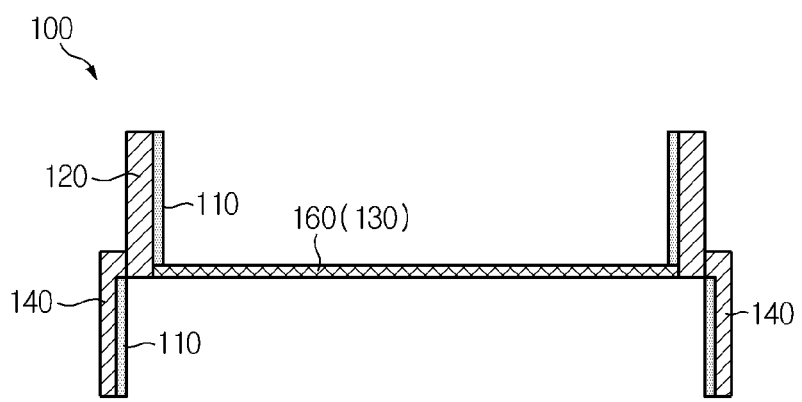
FIG. 19 is a cross-sectional view schematically illustrating a configuration of a cartridge for a secondary battery according to another embodiment of the present disclosure.

FIG. 19 is a cross-sectional view schematically illustrating a configuration of a cartridge 100 for a secondary battery according to another embodiment of the present disclosure.

Referring to FIG. 19, a heating member 160 may form a rest part 130. That is, in the cartridge 100 for a secondary battery according to the embodiment of the present disclosure, a rest part 130 may be formed by a heating member 160. In this case, the rest part 130 may be implemented in the form of a heat plate, and a secondary battery may be placed on the rest part 130.

According to the present embodiment of the present disclosure, since the rest part 130 is formed by the heating member 160, it is not necessary to use a member other than the heating member 160 to form the rest part 130, thereby making it easy to manufacture the cartridge 100 and reducing the volume and weight of the cartridge 100. In addition, an upper cartridge may supply heat to a secondary battery accommodated in an inner space of the upper cartridge and may also supply heat to a secondary battery accommodated in a lower cartridge, and thus heat may be efficiently supplied.

In addition, preferably, a battery module of the present disclosure may further include a temperature measuring unit and a control unit.

The temperature measuring unit may measure surrounding temperatures. For example, the temperature measuring unit may be attached to an inner or outer portion of the cartridge 100 to measure a temperature around a secondary battery.

The control unit may control the operation of the heating member 160 based on temperatures measured by the temperature measuring unit. To this end, the control unit may store a reference temperature range as a reference for operating the heating member 160. For example, if a temperature range in which a secondary battery accommodated in the battery module has optimal performance is from 70° C. to 150° C., the control unit may store the temperature range as a reference temperature range. If a temperature measured by the temperature measuring unit is lower than 70° C., the control unit may operate the heating member 160 to increase the temperature around the secondary battery to 70° C. or higher.

In addition, the control unit may operate the heating member 160 when the battery module starts to operate. For example, when the battery module starts to operate, that is, starts to be charged or discharged, the control unit may operate the heating member 160. Since a small amount of heat is generated during operation of a secondary battery such as an all-solid-state battery, the performance of the secondary battery may be low in the early stage of operation. However, according to the present embodiment, since the heating member 160 is operated, the performance of the secondary battery may be stably guaranteed in the early stage of operation.

The control unit may be implemented by a battery management system (BMS) of the battery module. The BMS is a component generally included in the battery module to manage operations of the battery module such as a charging operation or a discharging operation. According to the embodiment in which the control unit is implemented by the BMS, it is not necessary to use a separate component as a control unit for operating the heating member 160, thereby reducing costs and increasing the spatial efficiency of the battery module.

In addition, the heating member 160 may receive power from at least one of secondary batteries accommodated in cartridges 100. For example, if the battery module includes ten secondary batteries and ten cartridges 100, and the secondary batteries are respectively accommodated in different cartridges 100, heating members 160 of the cartridges

100 may generate heat from power respectively received from the secondary batteries accommodated in the cartridges 100. According to the present embodiment of the present disclosure, it is not necessary to add a separate secondary battery to the battery module so as to supply power to the heating member 160.

Furthermore, if the heating member 160 is configured to receive power from a plurality of secondary batteries, the control unit may compare state of charge (SOC) values of the secondary batteries to supply power to the heating member 160 from a secondary battery having the highest SOC value. According to the present embodiment of the present disclosure, inter-cell balancing may be carried out while supplying power to the heating member 160.

In addition, preferably, the battery module of the present disclosure may include two or more types of secondary batteries having different ionic conductivities at room temperature. That is, the battery module of the present disclosure may include a plurality of secondary batteries, and the plurality of secondary batteries may not be of the same type but may be of different types. In this case, the secondary batteries of different types may be secondary batteries having different ionic conductivities at least at room temperature.

In this case, the battery module of the present disclosure may be configured such that a secondary battery having high ionic conductivity at room temperature may supply power to the heating member 160.

For example, the battery module of the present disclosure may include liquid-electrolyte lithium batteries and all-solid-state lithium batteries having different ionic conductivities at room temperature. In particular, the battery module may include a large number of all-solid-state batteries and a small number of liquid-electrolyte batteries. In this case, the all-solid-state batteries may be used as main energy storage and output sources of the battery module, and the liquid-electrolyte batteries may supply power to the heating member 160.

In this configuration, when the battery module is initially operated, the inside temperature of the battery module may not be high, and thus the all-solid-state batteries may not be properly operated. Thus, the control unit may first operate the liquid-electrolyte batteries to supply power to the heating member 160. Then, owing to heat generated by the heating member 160, the inside temperature of the battery module may be increased to a level at which the all-solid-state batteries are activated. In addition, after the temperature around the all-solid-state batteries is increased to a proper level owing to heat generated by the heating member 160, the control unit may operate the all-solid-state batteries. Thus, the battery module may be stably operated.

Figure 20:
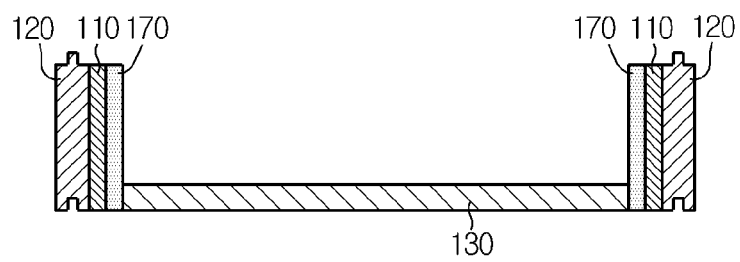
FIG. 20 is a cross-sectional view schematically illustrating a configuration of a cartridge for a secondary battery according to another embodiment of the present disclosure.

FIG. 20 is a cross-sectional view schematically illustrating a configuration of a cartridge for a secondary battery according to another embodiment of the present disclosure.

Referring to FIG. 20, according to the embodiment of the present disclosure, the cartridge of a battery module may further include a heat conduction member 170.

The heat conduction member 170 may include a thermally conductive material having thermal conductivity equal to or greater than a certain value so as to transfer heat from one side to another side, that is, from a high-temperature side to a low-temperature side. For example, the heat conduction member 170 may include a material having a thermal conductivity of 100 W/mK or greater at room temperature. Alternatively, the heat conduction member 170 may include a material having a thermal conductivity of 200 W/mK or greater, particularly 300 W/mK or greater, at room temperature.

Preferably, the heat conduction member 170 may include a metallic material such as silver, copper, platinum, or aluminum. Such a metallic material has very high thermal conductivity and formability. In particular, copper or aluminum may be suitable in terms of cost efficiency.

The heat conduction member 170 may extend from an upper end to a lower end of the cartridge. That is, as shown in FIG. 20, the heat conduction member 170 may vertically extend from the upper end to the lower end of the cartridge and may be exposed on both upper and lower ends thereof.

In particular, the upper and lower ends of the heat conduction member 170 may be brought into contact with heat conduction members 170 of other cartridges when cartridges are stacked. Cartridges may be configured to be stacked in a vertical direction, and when the cartridges are stacked, heat conduction members 170 of the cartridges may be connected to each other. That is, an upper end of a heat conduction member 170 of a lower cartridge may be brought into contact with and connected to a lower end of a heat conduction member 170 of an upper cartridge.

According to this configuration of the present disclosure, heat may be easily transferred between vertically stacked cartridges through the heat conduction members 170. Therefore, even if the internal temperature of some cartridges is relatively low, heat may be transferred from cartridges having a relatively high temperature to the cartridges having a relatively low temperature through the heat conduction members 170. Thus, temperature imbalance between cartridges may not easily occur and may be easily eliminated. For example, if the temperature of an inner space of an upper cartridge is lower than the temperature of an inner space of a lower cartridge, heat may be transferred from the lower cartridge to the inner space of the upper cartridge through a heat conduction member 170 of the lower cartridge and a heat conduction member 170 of the upper cartridge.

Moreover, according to this configuration of the present disclosure, heat may be transferred from the lowermost cartridge to the uppermost cartridge. Therefore, heat may be transferred between all cartridges stacked in a vertical direction of the battery module, and thus overall thermal balance may be guaranteed.

Particularly, a battery pack for a power storage device or a battery pack for an automobile is often placed outdoors, and if the outdoor temperature is low, for example, in winter, the temperature of the uppermost or lowermost cartridge may be relatively low. Therefore, according to the embodiment in which heat exchange between stacked cartridges easily occurs, the performance of a secondary battery having a relatively low surrounding temperature may not be markedly decreased.

The heat conduction member 170 may be provided inside a heat insulating member 110. Therefore, owing to the heat insulating member 110, heat may not leak from the heat conduction member 170 to the outside.

Preferably, the heat conduction member 170 may have a plate shape.

According to the present disclosure, in this case, the area of the heat conduction member 170 may be maximized, and thus heat exchange with surroundings may easily occur. For example, the heat conduction member 170 having a plate shape may easily absorb heat from a surrounding high-temperature part or transfer heat to a surrounding low-temperature part owing to a large surface area thereof. According to this configuration of the present disclosure, heat conduction members 170 may be easily brought into contact with each other, and thus heat transfer between the heat conduction members 170 may occur more smoothly.

In addition, preferably, the heat conduction member 170 may be configured to make contact with a portion of an outer casing of a secondary battery.

In particular, a pouch-type secondary battery may include an upper pouch and a lower pouch, and a sealing portion may be formed by bonding edge portions of the upper and lower pouches by a method such as a thermal fusing method in a state in which an electrode assembly is placed in an inner space between the upper and lower pouches. In this case, the heat conduction member 170 may be configured to make direct contact with the sealing portion of the secondary battery. For example, the heat conduction member 170 may be configured to make direct contact with an end region of the sealing portion of the secondary battery.

According to the present embodiment of the present disclosure, heat exchange between the heat conduction member 170 and the secondary battery may occur more smoothly and quickly. Therefore, the amount or rate of heat exchange may be increase when the heat conduction member 170 absorbs heat from the secondary battery or supplies heat to the secondary battery.

In another example, the heat conduction member 170 may make contact with a folded sealing portion of a secondary battery. For example, a sealing portion of a secondary battery may be folded upward. In this case, an outer surface of the folded sealing portion may be brought into contact with an inner surface of the heat conduction member 170.

According to this configuration of the present disclosure, the contact area between the secondary battery and the heat conduction member 170 may be increased. That is, the secondary battery and the heat conduction member 170 may make surface contact with each other, and thus the efficiency of heat transfer between the secondary battery and the heat conduction member 170 may be further improved. In addition, as the distance between the heat conduction member 170 and a main body of a secondary battery in which an electrode assembly and an electrolyte are accommodated is reduced, heat may be smoothly supplied to the electrolyte. In addition, the size of the battery module may be reduced by using the secondary battery having a folded structure.

The heat conduction member 170 may be provided on a lateral part 120 of the cartridge. The lateral part 120 may stand in a direction perpendicular to the ground, and in this case, the heat conduction member 170 may be easily configured to extend from an upper end portion to a lower end portion of the one cartridge. Further, according to this configuration of the present disclosure, owing to the structural bearing capacity of the lateral part 120, deformation or breakage of the heat conduction member 170 may be prevented. In addition, contact between heat conduction members 170 and the shape of heat conduction members 170 may be easily maintained.

Preferably, the heat conduction member 170 may be provided on inner surfaces of the lateral part 120. For example, in the structure shown in FIG. 20, a left heat conduction member 170 may face a right surface of a left lateral part 120 of the cartridge on which the secondary battery is placed, and a right heat conduction member 170 may face a left surface of a right lateral part 120 of the cartridge on which the secondary battery is placed.

According to the present embodiment of the present disclosure, since the secondary battery and the heat conduction member 170 directly face each other, no other object may exist between the secondary battery and the heat conduction member 170, and thus the secondary battery and the heat conduction member 170 may be located as close as possible to each other. Therefore, heat transfer between the secondary battery and the heat conduction member 170 may occur more easily, and thus heat may be smoothly absorbed from or supplied to the secondary battery.

In addition, a heat conduction member 170 may be further provided on the rest part 130.

For example, the cartridge of the present disclosure may include the rest part 130 and the lateral part 120, and the heat conduction members 170 may be provided on the lateral part 120 and the rest part 130. Particularly, the heat conduction member 170 may form the rest part 130. The heat conduction member 170 provided on the rest part 130 may face the secondary battery in a larger area than the heat conduction member 170 provided on the lateral part 120. Particularly, in the case of a pouch-type secondary battery approximately having two large surfaces, one of the two large surfaces may be placed on the rest part 130, and thus the heat conduction member 170 provided on the rest part 130 as described above may have a large contact area with the secondary battery. Therefore, heat exchange between the secondary battery and the heat conduction member 170 may occur more effectively.

In addition, the heat conduction member 170 provided on the rest part 130 may be in contact with the heat conduction member 170 provided on the lateral part 120. For example, the heat conduction member 170 provided on the lateral part 120 may be formed in one piece with the heat conduction member 170 provided on the rest part 130.

In this case, heat supplied from the secondary battery to the heat conduction member 170 of the rest part 130 may be transferred through the heat conduction member 170 of the lateral part 120 to heat conduction members 170 of other cartridges. In addition, heat supplied to the heat conduction member 170 of the lateral part 120 may be supplied to the secondary battery through the heat conduction member 170 of the rest part 130.

Therefore, according to the present embodiment of the present disclosure, the efficiency of heat transfer between the heat conduction members 170 and the secondary battery may be further improved.

As in the embodiment of the present disclosure shown in FIG. 11, when the cartridge includes the partition wall part 150, the partition wall part 150 may include a heat conduction member 170. The heat conduction member 170 provided on the partition wall part 150 may extend from an upper end to a lower end of the cartridge. Therefore, when such cartridges are stacked in a vertical direction, heat conductive members 170 provided on the partition wall parts 150 of upper and lower cartridges may be in contact with each other. Therefore, vertical heat transfer may occur through the heat conduction members 170 of the partition wall parts 150, and thus thermal imbalance of the battery module may be more effectively solved.

In this case, the heat conduction members 170 may be provided on both lateral surfaces of the partition wall parts 150. In this case, the partition wall parts 150 may exchange heat with secondary batteries located on both sides of the partition wall parts 150 through the heat conduction members 170 provided on the partition wall parts 150. In the above-described structure, alternatively, the heat conduction members 170 may form the partition wall parts 150.

The battery module of the present disclosure may be applied to automobiles such as electric or hybrid vehicles. According to the present disclosure, an automobile may include the battery module.

In addition, according to the present disclosure, the battery module may be applied to a power storage device. That is, according to the present disclosure, a power storage device may include the battery module. The power storage device may be used in various fields and places such as a smart grid system for regulating power supply or a charging station for electric vehicles.

While embodiments of the present disclosure has been described with reference to the accompanying drawings, it should be understood that the embodiments are given by way of illustration only, and various changes and modifications within the scope of the disclosure as defined by the appended claims will become apparent to those skilled in the art.

In the present disclosure, terms indicating directions such as upward, downward, leftward, rightward, forward, and backward are used, but these terms are for ease of description. It will be apparent to those skilled in the art that these terms can vary depending on the position of an object or an observer.

What is claimed is:

1. A battery module comprising:
    at least one secondary battery; and
    a cartridge receiving at least a portion of the secondary battery and configured to be stacked in at least one direction, the cartridge comprising a heat insulating member,
    wherein the secondary battery is an all-solid-state battery,
    wherein the cartridge comprises:
        a rest part configured to receive a lower portion of the secondary battery; and
        a lateral part standing on an edge of the rest part, and
    wherein the heat insulating member is arranged between a side of the secondary battery and the lateral part to trap heat around the secondary battery whereby a temperature of the secondary battery is increased relative to a room temperature.

2. The battery module of claim 1, wherein the heat insulating member is provided on the lateral part.

3. The battery module of claim 2, wherein the at least one secondary battery includes a plurality of secondary batteries,
    wherein the cartridge is provided in plurality and corresponding to the number of secondary batteries and the secondary batteries and cartridges are stacked in the at least one direction to provide a cartridge stack, and
    wherein the battery module further comprises a lower cover comprising a heat insulating material in at least a portion thereof and configured to be coupled to a lower portion of a lowermost cartridge in the cartridge stack.

4. The battery module of claim 2, wherein the heat insulating member is further provided on the rest part.

5. The battery module of claim 1, wherein the at least one secondary battery includes a plurality of secondary batteries,
    wherein the cartridge is provided in plurality and corresponding to the number of secondary batteries and the secondary batteries and cartridges are stacked in the at least one direction to provide a cartridge stack, and
    wherein the battery module further comprises an upper cover comprising a heat insulating material in at least a portion thereof and configured to be coupled to an upper portion of an uppermost cartridge in the cartridge stack.

6. The battery module of claim 1, wherein the at least one secondary battery includes a plurality of secondary batteries,
    wherein the cartridge is provided in plurality and corresponding to the number of secondary batteries and the secondary batteries and cartridges are stacked in the at least one direction to provide a cartridge stack, and
    wherein a lower cartridge of the cartridge of the cartridge stack further comprises a lower cover part configured to surround at least a portion of a lateral outer surface of the lower cartridge in the cartridge stack.

7. The battery module of claim 1, wherein the at least one secondary battery includes a plurality of secondary batteries,
    wherein the cartridge accommodates the plurality of secondary batteries arranged in a horizontal direction and comprises a partition wall part vertically standing between adjacent secondary batteries arranged in the horizontal direction, and
    the partition wall part comprises a heat insulating member.

8. The battery module of claim 1, wherein at least a portion of the heat insulating member is detachably attached to the cartridge.

9. The battery module of claim 1, wherein the cartridge comprises only the heat insulating member.

10. The battery module of claim 1, wherein the heat insulating member comprises at least one of glass wool, expanded polystyrene (EPS), extruded polystyrene (XPS), polyurethane foam, water-based flexible foam, urea foam, vacuum insulation panels, polyvinyl chloride (PVC), and a thermal reflective insulation material.

11. The battery module of claim 1, wherein the cartridge further comprises a heating member configured to supply heat to a side of the secondary battery.

12. The battery module of claim 11, further comprising:
    a temperature measuring unit configured to measure surrounding temperatures; and
    a control unit configured to control operation of the heating member according to temperatures measured by the temperature measuring unit.

13. The battery module of claim 1, wherein the battery module comprises at least two types of secondary batteries having different ionic conductivities at room temperature.

14. The battery module of claim 1, wherein the cartridge further comprises a heat conduction member extending from an upper end portion to a lower end portion of the cartridge.

15. The battery module of claim 14, wherein the at least one secondary battery includes a plurality of secondary batteries,
    wherein the cartridge is provided in plurality and corresponding to the number of secondary batteries and the secondary batteries and cartridges are stacked in the at least one direction to provide a cartridge stack, and
    wherein, when in the cartridge stack, the heat conduction member of an upper cartridge in the cartridge stack and the heat conduction member of a lower cartridge in the cartridge stack contact each other.

16. An automobile comprising the battery module of claim 1.

17. A power storage device comprising the battery module of claim 1.

* * * * *